US012098716B2

(12) United States Patent
Greiner et al.

(10) Patent No.: US 12,098,716 B2
(45) Date of Patent: Sep. 24, 2024

(54) ELECTROMECHANICAL BRAKE PRESSURE GENERATOR FOR A HYDRAULIC BRAKING SYSTEM

(71) Applicant: Robert Bosch GmbH, Stuttgart (DE)

(72) Inventors: Matthias Greiner, Simmozheim (DE); Claus Oehler, Karlsruhe (DE); Sebastian Martin Reichert, Affaltrach (DE)

(73) Assignee: ROBERT BOSCH GMBH, Stuttgart (DE)

( * ) Notice: Subject to any disclaimer, the term of this patent is extended or adjusted under 35 U.S.C. 154(b) by 293 days.

(21) Appl. No.: 17/601,667

(22) PCT Filed: Feb. 4, 2020

(86) PCT No.: PCT/EP2020/052784
§ 371 (c)(1),
(2) Date: Oct. 5, 2021

(87) PCT Pub. No.: WO2020/216479
PCT Pub. Date: Oct. 29, 2020

(65) Prior Publication Data
US 2022/0144239 A1    May 12, 2022

(30) Foreign Application Priority Data
Apr. 25, 2019   (DE) .......................... 102019205974.0

(51) Int. Cl.
*B60T 13/74*   (2006.01)
*B60T 8/40*    (2006.01)
(Continued)

(52) U.S. Cl.
CPC .............. *F04B 9/00* (2013.01); *B60T 8/4022* (2013.01); *B60T 13/745* (2013.01);
(Continued)

(58) Field of Classification Search
None
See application file for complete search history.

(56) References Cited

U.S. PATENT DOCUMENTS

| 5,558,409 A | * | 9/1996 | Walenty | .................. | B60T 7/042 |
|---|---|---|---|---|---|
| | | | | | 303/155 |
| 5,782,322 A | * | 7/1998 | Hauck | ..................... | F16D 65/18 |
| | | | | | 188/162 |

(Continued)

FOREIGN PATENT DOCUMENTS

| DE | 102010039916 A1 | 3/2011 |
|---|---|---|
| DE | 102011007025 A1 | 10/2012 |

(Continued)

OTHER PUBLICATIONS

International Search Report for PCT/EP2020/052784, Issued May 19, 2020.

*Primary Examiner* — Nathan C Zollinger
*Assistant Examiner* — Timothy P Solak
(74) *Attorney, Agent, or Firm* — NORTON ROSE FULBRIGHT US LLP; Gerard A. Messina

(57) ABSTRACT

An electromechanical brake pressure generator for a hydraulic braking system of a vehicle. The electromechanical brake pressure generator encompasses a screw drive assemblage for converting an input-drive-side rotational motion into a translational motion for brake pressure generation. The screw drive assemblage encompasses a spindle that is rotatable via an electric motor, a spindle nut that interacts with a thread of the spindle so that the spindle nut is axially displaceable with a rotation of the spindle, and a housing that at least partly surrounds the spindle and the spindle nut. The screw drive assemblage additionally encompasses a drive wheel, which is disposed nonrotatably on the spindle and by way of which the spindle is connected to the electric motor. The spindle and the drive wheel are mounted, via a (Continued)

common bearing, rotatably with respect to the stationary housing. The bearing is radially surrounded at least partly by the drive wheel.

7 Claims, 4 Drawing Sheets

(51) Int. Cl.
*F04B 9/00* (2006.01)
*F16H 25/20* (2006.01)
*B60T 7/04* (2006.01)
*F04B 17/03* (2006.01)
*F04B 19/22* (2006.01)

(52) U.S. Cl.
CPC ............ *B60T 13/746* (2013.01); *F16H 25/20* (2013.01); *B60T 7/042* (2013.01); *F04B 17/03* (2013.01); *F04B 19/22* (2013.01)

(56) References Cited

U.S. PATENT DOCUMENTS

| | | | | |
|---|---|---|---|---|
| 8,777,331 | B2* | 7/2014 | Fukushima | B60T 13/745 |
| | | | | 303/2 |
| 9,586,564 | B2* | 3/2017 | Weh | B60T 8/4018 |
| 2002/0020591 | A1* | 2/2002 | Schanzenbach | F16D 65/18 |
| | | | | 188/158 |
| 2012/0160043 | A1* | 6/2012 | Drumm | H02K 7/06 |
| | | | | 74/89.23 |
| 2017/0137005 | A1* | 5/2017 | Weh | F04B 23/025 |

FOREIGN PATENT DOCUMENTS

| | | |
|---|---|---|
| JP | 2002070901 A | 3/2002 |
| WO | 2017045804 A1 | 3/2017 |

* cited by examiner

ELECTROMECHANICAL BRAKE PRESSURE GENERATOR FOR A HYDRAULIC BRAKING SYSTEM

FIELD

The present invention relates to an electromechanical brake pressure generator for a hydraulic braking system of a vehicle, and to a vehicle encompassing an electromechanical brake pressure generator.

The electromechanical brake pressure generator encompasses in particular a screw drive assemblage for converting an input-drive-side rotational motion into a translational motion for brake pressure generation.

BACKGROUND INFORMATION

The driver's foot force is usually not sufficient for braking motor vehicles, so that they are usually equipped with a brake booster. Conventional brake boosters usually operate with a negative pressure generated by the internal combustion engine, the pressure difference between the engine pressure and ambient pressure being used to apply a boost force, in addition to the driver's foot force, onto the piston rod of the piston/cylinder unit.

Alternative brake pressure buildup devices will be needed for future motor-vehicle drive concepts, since negative pressure will no longer be available for operating a conventional vacuum brake booster. The electromechanical brake pressure generators of interest here were developed for this purpose.

The actuation pressure at the piston/cylinder unit is generated here by way of an electric motor. Electromechanical brake pressure generators of this kind can be used not only to furnish an auxiliary force but also, in brake-by-wire systems, for exclusive provision of the actuating force. Electromechanical brake pressure generators are therefore advantageous in particular with regard to autonomous driving.

PCT Patent Application No. WO 2017/045804 A1 describes a conventional electromechanical brake booster that is depicted in FIG. 1. In contrast thereto, the present invention is directed toward an electromechanical brake pressure generator that can apply a braking force independently of actuation of the brake pedal. The conventional brake booster 1 encompasses a spindle nut 2 and an electric motor (not depicted), operation of which allows a rotation to be imparted to spindle nut 2 via a spur gear 3. Spindle nut 2 is in operative engagement with a spindle 4, and a translational motion along its spindle axis 5 can therefore be imparted to spindle 4 by way of spindle nut 2 that has been caused to rotate. Brake booster 1 has a bearing assemblage 6 to which spindle 4 is fixedly connected, so that spindle 4 does not also rotate because of the rotation of spindle nut 2.

Bearing assemblage 6 encompasses a bracket 6a at whose edges two plain bearings 6b are disposed. Plain bearings 6b run on tie rods 7 that extend substantially parallel to spindle axis 5. By way of this bearing assemblage 6, spindle 4 is movable in an axial direction and is prevented from twisting.

An object of the present invention is to provide an electromechanical brake pressure generator that is improved in terms of installation space, functionality, and manufacturing costs.

SUMMARY

The object is achieved by way of an electromechanical brake pressure generator for a hydraulic braking system in accordance with an example embodiment of the present invention. Advantageous embodiments and refinements of the present invention are disclosed herein.

The present invention relates to an electromechanical brake pressure generator for a hydraulic braking system of a vehicle. The electromechanical brake pressure generator encompasses at least one screw drive assemblage for converting an input-drive-side rotational motion into a translational motion for brake pressure generation. The screw drive assemblage encompasses: a spindle that is rotatable via an electric motor; a spindle nut that interacts with a thread of the spindle so that the spindle nut is axially displaceable with a rotation of the spindle; and a housing that at least partly surrounds the spindle and the spindle nut.

The screw drive assemblage furthermore encompasses a drive wheel, which is disposed nonrotatably on the spindle and by way of which the spindle is connected to the electric motor, the spindle and the drive wheel being mounted, via a common bearing, rotatably with respect to the stationary housing.

A "screw drive assemblage" is understood both as a simple spindle drive in which the spindle nut is in direct contact with the spindle, and as a ball screw drive. A ball screw drive is a thread-type drive having balls introduced between the spindle and spindle nut. The two parts have respective helical grooves that together form a helical tube filled with balls. The positive connection in the thread transversely to the helix occurs not between the thread groove and thread wall, as in a simple spindle drive, but rather via the balls.

The drive wheel can be directly in engagement with the electric motor. The electric motor can also be directly connected to an upstream linkage that is in direct engagement with the drive wheel.

In accordance with an example embodiment of the present invention, the spindle and the drive wheel are mounted with respect to the housing via a common bearing. A disposition of this kind is possible because the drive wheel is connected nonrotatably to the spindle. Preferably, the drive wheel is additionally immobilized in an axial direction on the spindle. As a result of this disposition, a further bearing for the spindle or the drive wheel thus does not need to be provided. The installation space, weight, and cost for an additional bearing can thus be eliminated. The functionality of mounting the drive wheel and the spindle is additionally provided by one bearing. As a result, an electromechanical brake pressure generator of this kind is smaller and can be manufactured more economically.

The bearing is furthermore radially surrounded at least partly by the drive wheel. In other words, the bearing is disposed at least partly in a region of the drive wheel, so that the bearing and the drive wheel cover identical axial regions of the spindle. Preferably, the bearing is completely surrounded radially by the drive wheel. Disposing the bearing in this manner allows the installation space required by the drive wheel and bearing to be reduced, so that an electromechanical brake pressure generator of this kind can be made smaller.

In a further preferred embodiment of the present invention, the bearing is embodied as a rolling bearing. Many varieties of such bearings are obtainable, so that a bearing that is optimal, for example, in terms of size and load capacity can be selected.

The bearing is preferably disposed between the spindle and housing. In other words, the spindle is mounted with respect to the housing directly via the bearing. The bearing thus abuts directly against the spindle and against the housing, so that mounting of the spindle with respect to the housing is ensured via the bearing. Unlike the spindle, the drive wheel is mounted indirectly. This means that the drive wheel is also mounted with respect to the spindle via the connection. This makes possible good mounting of the spindle. It is additionally possible to install a small bearing, thereby saving installation space and weight.

In an alternative embodiment of the present invention, the bearing is disposed between the drive wheel and the housing. The drive wheel is thus mounted with respect to the housing directly via the bearing. Both the housing and the drive wheel abut directly against the bearing, so that mounting of the drive wheel with respect to the housing is ensured via the bearing. The spindle, on the other hand, is mounted only indirectly. This means that the spindle is also mounted via the connection to the drive wheel. This makes possible direct mounting of the drive wheel.

Advantageously, the bearing is disposed on an end face of the drive wheel which faces away from the spindle. The "end face which faces away from the spindle" is understood as the face that points away from a longitudinal extent of the spindle. As a result, the bearing must be installed on the spindle after the drive wheel during assembly of the electromechanical brake pressure generator. As a rule, an additional housing part that fits around the drive wheel must be provided in order to mount the housing with respect to the bearing. Further devices of the brake pressure generator can be attached to this housing part.

In a further advantageous embodiment of the present invention, the bearing is disposed on an end face of the drive wheel which faces toward the spindle. The end face facing toward the spindle is that side of the drive wheel which points toward a longitudinal extent of the spindle. As a result, the bearing must be installed on the spindle before the drive wheel during assembly of the electromechanical brake pressure generator. This can have advantages in terms of installation or construction. In addition, in contrast to the disposition of the bearing on an end face facing away from the spindle, there is no need for a housing part that fits around the drive wheel, so that an electromechanical brake pressure generator of this kind can be made to be smaller.

The bearing and the drive wheel are preferably disposed at a spindle end. In other words, the spindle does not project substantially beyond the bearing/drive wheel assemblage, so that no additional installation space needs to be provided for it. In addition, the bearing and the drive wheel can be more easily installed from the spindle end.

The present invention furthermore provides a vehicle having an electromechanical brake pressure generator for a hydraulic braking system. The advantages described above with respect to the electromechanical brake pressure generator can be achieved with such a vehicle. In a preferred embodiment of the present invention, this vehicle can be an automated or entirely autonomous vehicle.

Exemplifying embodiments of the present invention are explained in further detail in the description below and are depicted in the figures.

DETAILED DESCRIPTION OF EXAMPLE EMBODIMENTS

Figure 1:
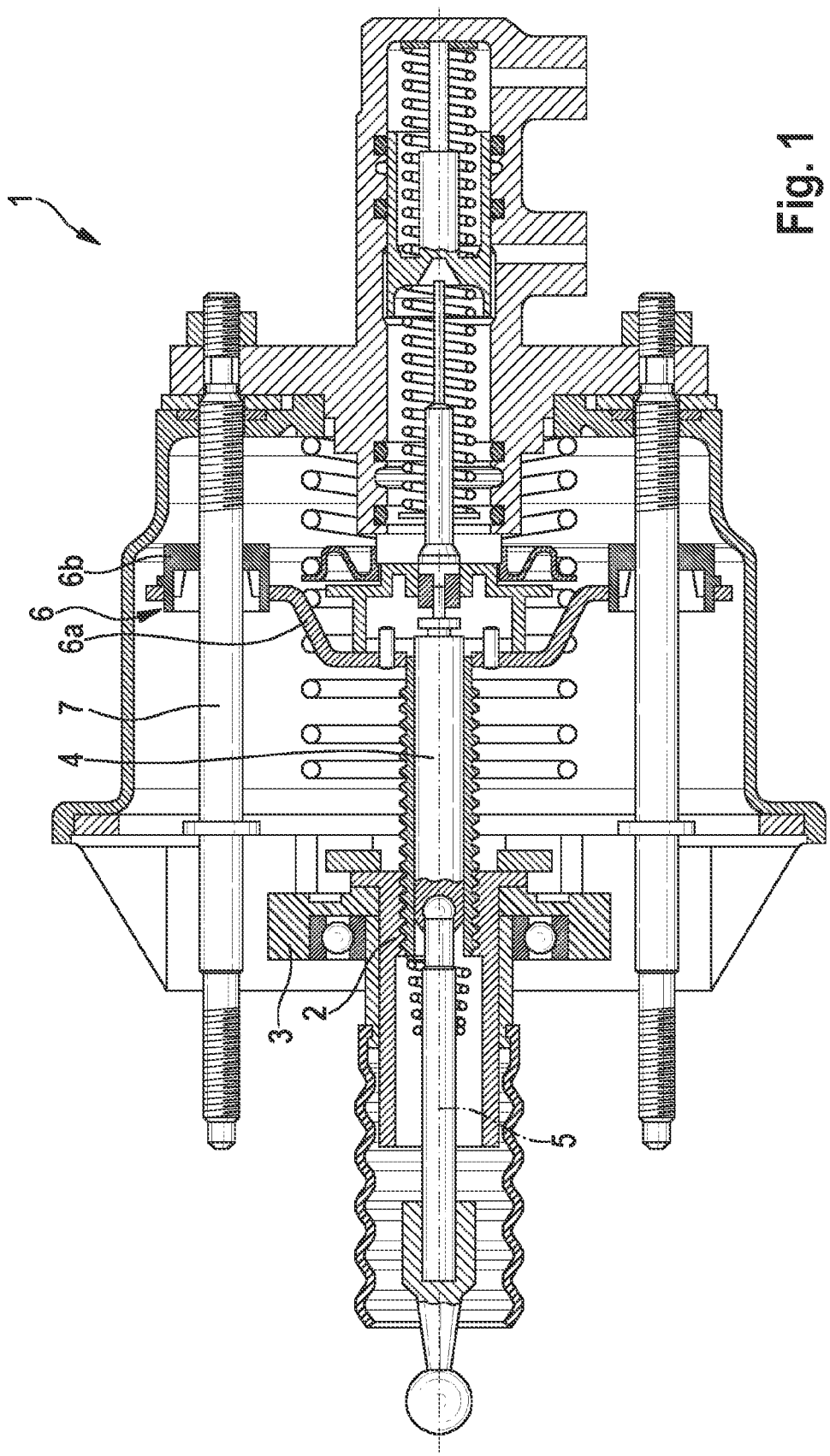
FIG. 1 depicts a conventional electromechanical brake booster.
Figure 2:
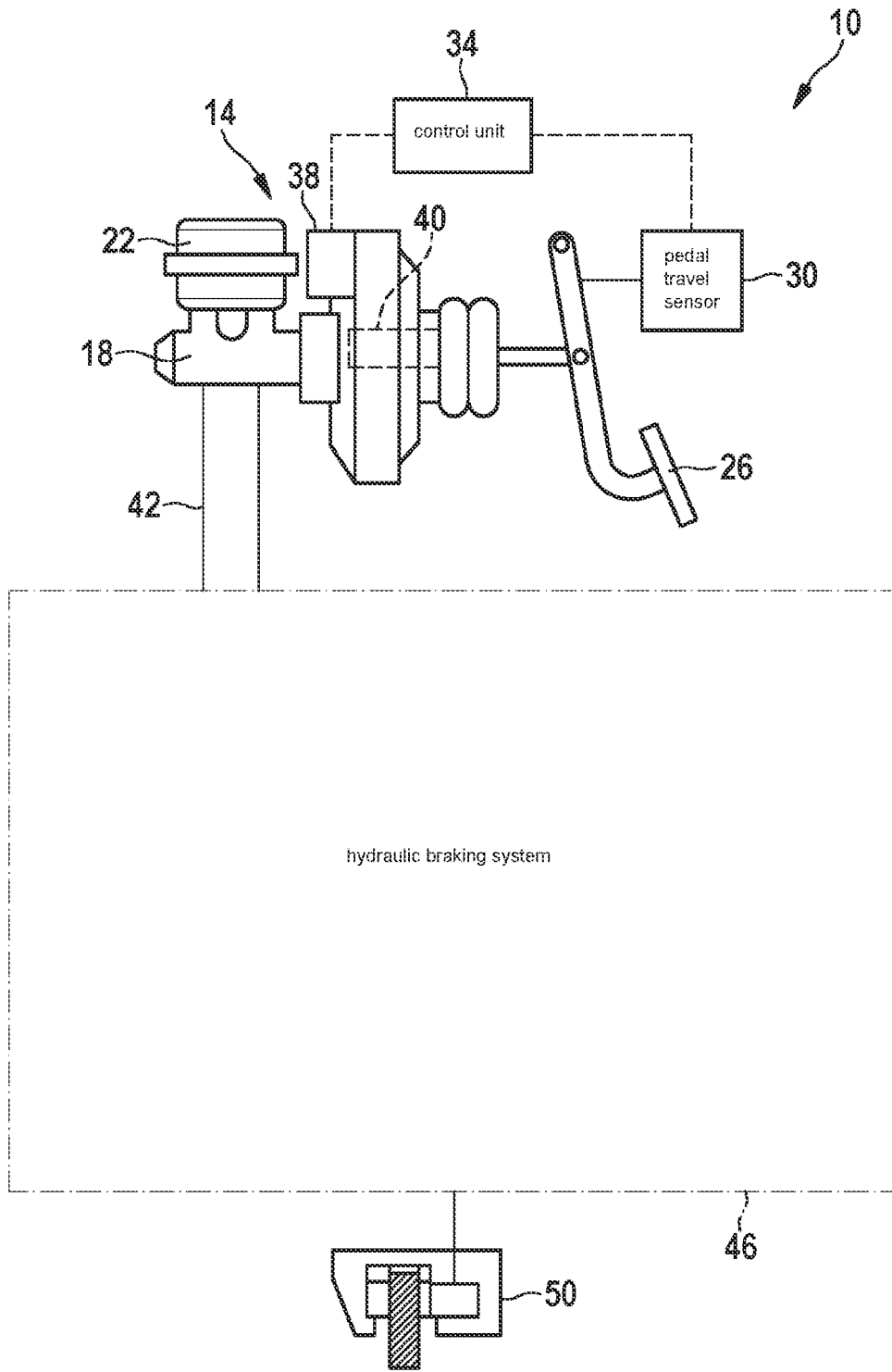
FIG. 2 schematically depicts a hydraulic braking system for a vehicle having an electromechanical brake pressure generator.

FIG. 2 schematically depicts a hydraulic braking system 10 for a vehicle, having an electromechanical brake pressure generator 14. Hydraulic braking system 10 encompasses electromechanical brake pressure generator 14. This brake pressure generator 14 encompasses a piston/cylinder unit 18 that is supplied with brake fluid via a brake fluid reservoir 22.

Piston/cylinder unit 18 can have control applied to it via a brake pedal 26 actuated by the driver, and the resulting brake pedal travel is measured by a pedal travel sensor 30 and forwarded to a control unit 34. Although FIG. 2 shows in principle a brake booster, it is not essential here that the brake pedal travel be measured via pedal travel sensor 30. Brake pressure generation without a brake pedal travel is also possible, so that the vehicle can also be braked in the autonomous driving state.

On the basis of the measured brake pedal travel, control device 34 generates a control signal for an electric motor 38 of brake pressure generator 14. Electric motor 38, which is connected to a linkage (not shown) of brake pressure generator 14, amplifies, in accordance with the control signal, the braking force inputted by brake pedal 26. For this, control is applied by electric motor 38, in accordance with the actuation of brake pedal 26, to a screw drive assemblage 40 disposed in brake pressure generator 14, so that the rotational motion of electric motor 38 is converted into a translational motion.

The brake fluid present in piston/cylinder unit 18 becomes pressurized by the actuation of brake pedal 26, with the aid of brake pressure generator 14. This brake pressure is forwarded via brake lines 42 to a hydraulic braking system 46. Hydraulic braking system 46, which is depicted here simply as a box, is constituted by a variety of valves and further components in order to implement, for example, an electronic stability program (ESP). Hydraulic braking system 46 is additionally connected to at least one wheel brake device 50, so that a braking force can be applied to wheel brake device 50 by corresponding switching of valves.

Figure 3:
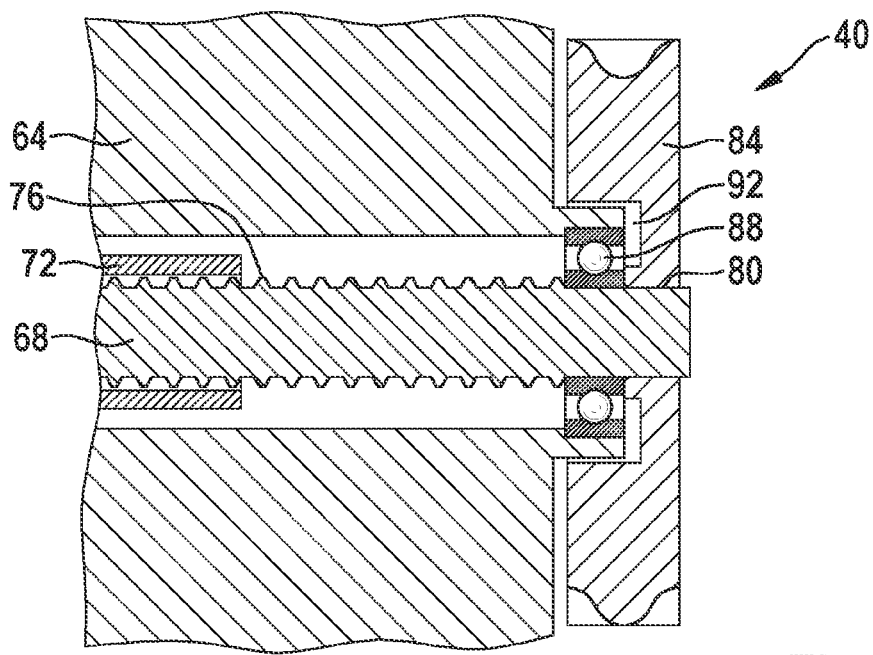
FIG. 3 is a longitudinal section of a first exemplifying embodiment of a screw drive assemblage for an electromechanical brake pressure generator, in accordance with the present invention.

FIG. 3 is a longitudinal section of a first exemplifying embodiment of a screw drive assemblage 40 for an electromechanical brake pressure generator 14. Screw drive assemblage 40 encompasses a housing 64 that surrounds part of a spindle 68. In this exemplifying embodiment, housing 64 is configured from metal. Screw drive assemblage 40 additionally encompasses a spindle nut 72 that surrounds a portion of spindle 68 and is in engagement with a thread 76 of spindle 68.

At one spindle end 80, a drive wheel 84 is connected nonrotatably to spindle 68 so that spindle 68 is drivable via electric motor 38 shown in FIG. 2. A rotational motion is imparted by electric motor 38 to spindle 68, which thereby displaces, in an axial direction, spindle nut 72 that interacts with thread 76.

Screw drive assemblage 40 additionally encompasses a bearing 88 that is embodied as a rolling bearing. Spindle 68 and drive wheel 84 are mounted with respect to housing 64 by way of bearing 88. The rolling bearing is disposed at spindle end 80 between housing 64 and spindle 68. In particular, drive wheel 84 forms a cutout 92 on an end face facing toward spindle 68, so that bearing 88 is positioned in cutout 92 of drive wheel 84. As a result, bearing 88 is radially surrounded by drive wheel 84 and is disposed on an end face of drive wheel 84 which faces toward spindle 68.

Figure 4:
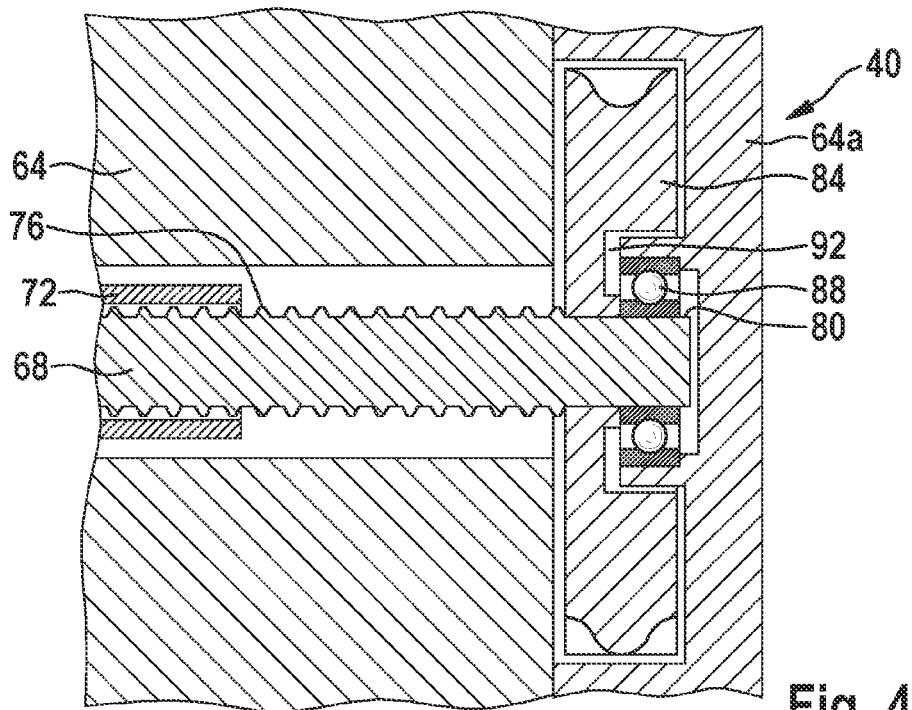
FIG. 4 is a longitudinal section of a second exemplifying embodiment of a screw drive assemblage for an electromechanical brake pressure generator, in accordance with the present invention.

A second exemplifying embodiment of screw drive assemblage 40 for electromechanical brake pressure generator 14 is shown in FIG. 4. This exemplifying embodiment differs from the first exemplifying embodiment shown in FIG. 3 in that bearing 88 is disposed on an end face of drive wheel 84 facing away from spindle 68. Cutout 92 in drive wheel 84 is correspondingly embodied on that end face. In this exemplifying embodiment an additional housing part 64a that fits around drive wheel 84 is embodied, so that spindle 68 is mounted with respect to housing 64 via bearing 88.

Figure 5:
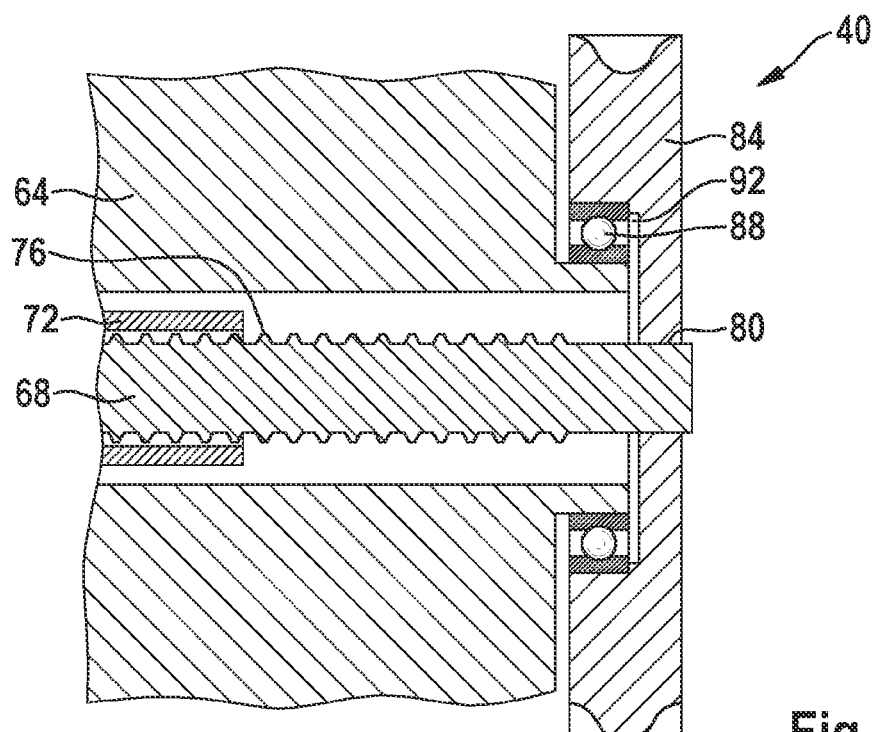
FIG. 5 is a longitudinal section of a third exemplifying embodiment of a screw drive assemblage for an electromechanical brake pressure generator, in accordance with the present invention.

FIG. 5 is a longitudinal section of a third exemplifying embodiment of screw drive assemblage 40 for electromechanical brake pressure generator 14. This exemplifying embodiment is configured similarly to the first exemplifying embodiment shown in FIG. 3. In contrast to the first exemplifying embodiment, however, bearing 88 is disposed not between spindle 68 and housing 64, but instead between housing 64 and drive wheel 84, so that spindle 68 is mounted via drive wheel 84.

In the exemplifying embodiment shown in FIG. 5, bearing 88 is disposed on an end face of drive wheel 84 which faces toward spindle 68. It is also possible for bearing 88 to be disposed on an end face of drive wheel 84 which faces away from spindle 68.

What is claimed is:

1. An electromechanical brake pressure generator for a hydraulic braking system of a vehicle, comprising:
   at least one screw drive assemblage configured to convert an input-drive-side rotational motion into a translational motion; and
   a piston/cylinder unit, actuatable by the screw drive assemblage, configured for brake pressure generation;
   wherein the screw drive assemblage includes:
      a spindle that is rotatable via an electric motor,
      a spindle nut that interacts with a thread of the spindle so that the spindle nut is axially displaceable with a rotation of the spindle,
      a stationary housing that at least partly surrounds the spindle and the spindle nut, and
      a drive wheel which is disposed nonrotatably on the spindle and by way of which the spindle is connected to the electric motor,
   wherein the spindle and the drive wheel are mounted, via a common bearing, rotatably with respect to the stationary housing, and the bearing is radially surrounded at least partly by the drive wheel, and
   wherein the bearing is disposed on an end face of the drive wheel which faces toward the spindle.

2. The electromechanical brake pressure generator as recited in claim 1, wherein the bearing is a rolling bearing.

3. The electromechanical brake pressure generator as recited in claim 1, wherein the bearing is disposed between the spindle and the housing.

4. The electromechanical brake pressure generator as recited in claim 1, wherein the bearing is disposed between the drive wheel and the housing.

5. The electromechanical brake pressure generator as recited in claim 1, wherein the bearing is disposed on an end face of the drive wheel which faces away from the spindle.

6. The electromechanical brake pressure generator as recited in claim 1, wherein the bearing and the drive wheel are disposed at an end of the spindle.

7. A vehicle comprising the electromechanical brake pressure generator as recited in claim 1.

* * * * *